(12) United States Patent
Cousineau

(10) Patent No.: US 6,771,903 B1
(45) Date of Patent: Aug. 3, 2004

(54) FIBER OPTIC SAFETY SYSTEM FOR WIND TURBINES

(75) Inventor: Kevin Lewis Cousineau, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 10/017,124

(22) Filed: Dec. 14, 2001

(51) Int. Cl.[7] .............................................. H04B 10/08
(52) U.S. Cl. ...................... 398/17; 398/141; 398/115
(58) Field of Search .............................. 359/154, 173; 340/507; 398/19, 9, 15, 32, 33, 38, 140, 141, 17, 115

(56) References Cited

U.S. PATENT DOCUMENTS

| | | | | |
|---|---|---|---|---|
| 4,545,077 A | * | 10/1985 | Drapala et al. ............. | 359/118 |
| 4,815,936 A | * | 3/1989 | Stoltze et al. ................ | 416/9 |
| 5,422,826 A | | 6/1995 | Cousineau ................. | 700/287 |
| 5,584,655 A | | 12/1996 | Deering ....................... | 416/31 |
| 5,907,192 A | | 5/1999 | Lyons et al. .................. | 290/44 |
| 6,137,187 A | | 10/2000 | Mikhail ....................... | 290/44 |
| 6,265,785 B1 | | 7/2001 | Cousineau ................. | 290/44 |
| 6,420,796 B1 | | 7/2002 | Lagerwey .................... | 290/44 |

* cited by examiner

*Primary Examiner*—Leslie Pascal
*Assistant Examiner*—Christina Y Leung
(74) *Attorney, Agent, or Firm*—Blakely, Sokoloff, Taylor & Zafman LLP

(57) ABSTRACT

A fiber optic safety system for a wind turbine. The system includes a series of switching elements coupled together to indicate a fail-safe condition of the wind turbine. The system also includes a plurality of optical transceivers, a plurality of optical conductors, and a blade pitch controller. Each of the optical transceivers is disposed at least at a down tower and an up tower of the wind turbine. The optical conductors are then coupled to the optical transceivers to carry optical signals between the down tower and the up tower. The blade pitch controller is connected to an up-tower optical transceiver, where the controller controls wind turbine blades.

20 Claims, 4 Drawing Sheets ent of the present invention.
FIBER OPTIC SAFETY SYSTEM FOR WIND TURBINES

BACKGROUND

1. Field of the Invention

The present invention relates to wind turbines. More particularly, the invention relates to fiber optic safety system for such wind turbines.

2. Prior Art

A typical safety system for a wind turbine may include a series of switches connected to Emergency Feather Command (EFC) relays in Blade Pitch Controller (BPC). Emergency stop buttons, hub lock switches, over-speed sensors, and watchdog timers may be connected in a series loop. The loop may also include other items required to provide proper equipment and personnel safety during failure modes. Therefore, if any of these buttons, switches, and/or sensors in the loop is open, aerodynamics is applied to pitch the turbine blades into a 90-degree feathered position, and/or mechanical braking to stop the turbine rotation. The safety system further includes stored energy source, such as a battery, that enables blade pitch to occur after a loss of power.

The series loop may originate from the up-tower (referred to as a nacelle) or the down-tower controller. In either case, electrical wires connect the safety system between the down-tower controller and the up-tower controller, including the Blade Pitch Controller. However, the electrical connection between the down-tower and up-tower controllers may be adversely affected by common mode noise, such as electrical and/or electromagnetic interferences. Furthermore, the interferences may also affect the overall control system because of the noise induction into the power supply.

SUMMARY

The present invention, in one aspect, describes a fiber optic safety system for a wind turbine. The system includes a series of switching elements coupled together to indicate a fail-safe condition of the wind turbine. The system also includes a plurality of optical transceivers, a plurality of optical conductors, and a blade pitch controller. The optical transceivers are coupled to the series of switching elements. Moreover, each of the optical transceivers is disposed at least at a down tower and an up tower of the wind turbine. The optical conductors are then coupled to the optical transceivers to carry optical signals between the down tower and the up tower. The blade pitch controller is connected to an up-tower optical transceiver, where the controller controls wind turbine blades.

In another aspect, the present invention describes a method to optically monitor safety condition of a wind turbine. The method includes monitoring a state of safety switches. Optical signals are then transmitted between an up tower and a down tower as a result of the state of safety switches. The wind turbine blades are pitched to desired positions when the optical signals indicate a safe condition. Otherwise, when the optical signals indicate a fail condition, the wind turbine blades are pitched into a feathered position.

DETAILED DESCRIPTION

In recognition of the above-stated problems associated with prior art designs of a wind turbine safety system, the present invention describes embodiments for a wind turbine fiber optic safety system. Specifically, optical transceivers are used to transmit optical signals between up-tower and down-tower controllers. Consequently, for purposes of illustration and not for purposes of limitation, the exemplary embodiments of the invention are described in a manner consistent with such use, though clearly the invention is not so limited.

Figure 1:
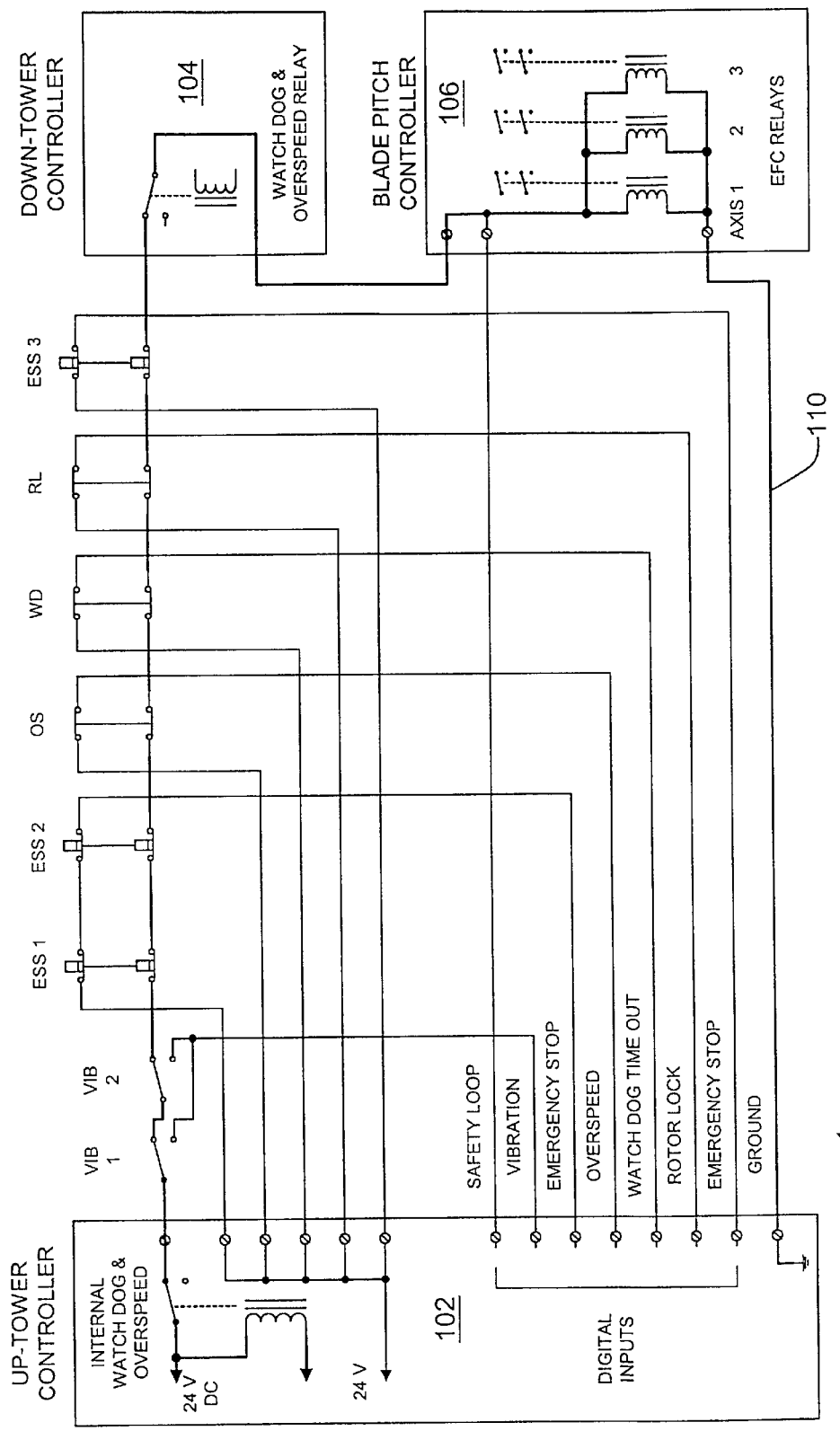
FIG. 1 illustrates a conventional wind turbine safety system.

FIG. 1 illustrates a conventional wind turbine safety system 100. The system 100 includes an up-tower controller 102, a down-tower controller 104, a blade pitch controller 106, and a series of switching elements connected in a series loop 110 (indicated as dark lines). Each controller 102 or 104 includes internal watch dog and overspeed relays. The switching elements include emergency stop buttons (ESS1, ESS2, ESS3), rotor lock switches (RL), independent overspeed sensors (OS), and independent watchdog timers (WD). The switching elements may also include vibration switches (VIB1, VIB2) that open when excessive vibration is sensed. The blade pitch controller 106 includes emergency feather command (EFC) relays for each blade axes. FIG. 1 shows three such relays. However, in some embodiments, there may be two relays if only two blades are used on the turbine design.

Figure 2:
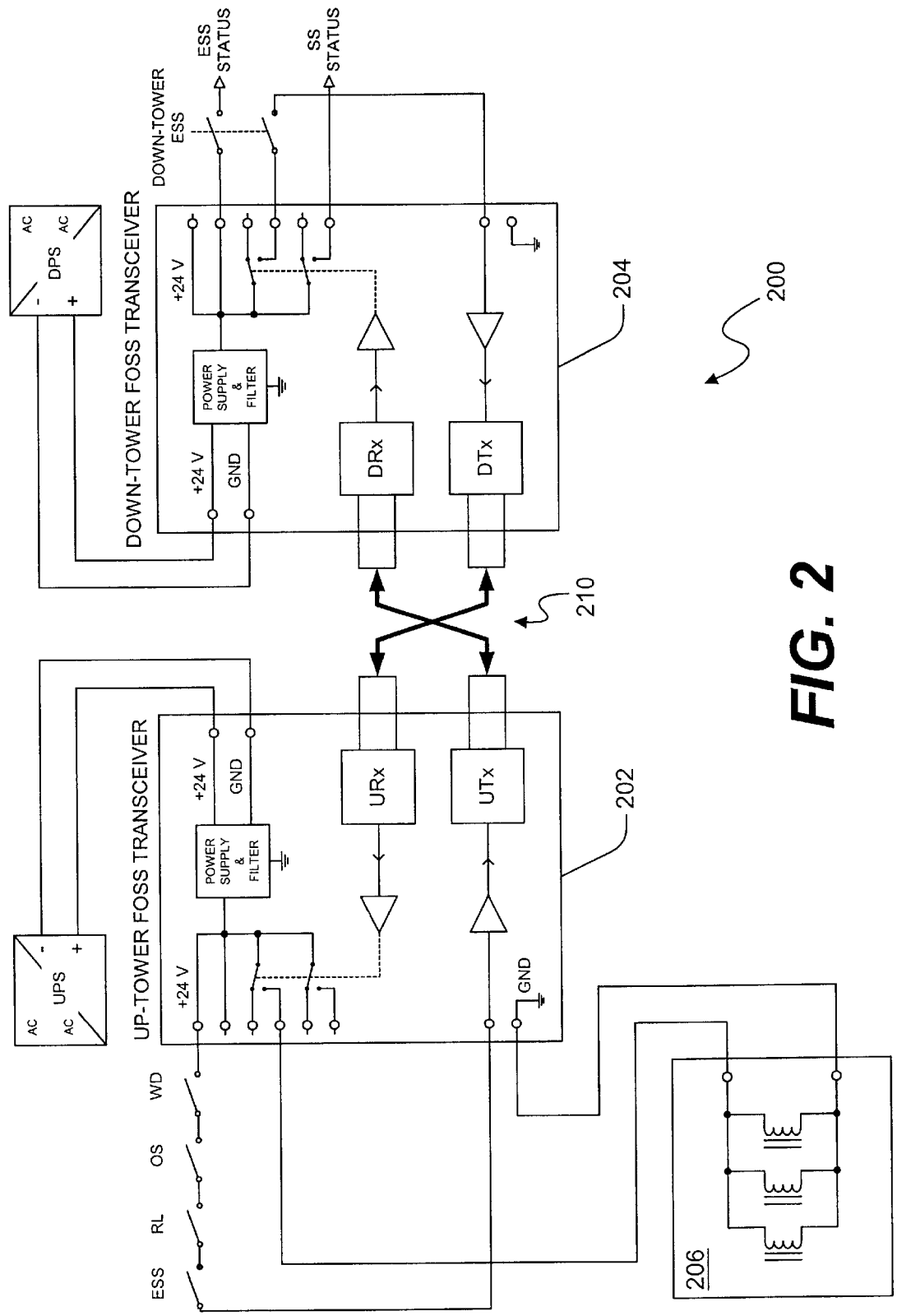
FIG. 2 illustrates a fiber optic safety system according to an embodiment of the present invention.

A fiber optic safety system 200 according to an embodiment of the present invention is illustrated in FIG. 2. The fiber optic system 200 includes at least two optical transceivers 202, 204 configured to convert the safety system's electrical signals into optical signals for transmission between the up-tower controller and the down-tower controller over optical conductors 210. In some embodiments, the optical conductors 210 are fiber optic cables.

The fiber optic system 200 also includes a series of safety switching elements connected to both the Up-Tower Fiber Optic Safety System (FOSS) Transceiver and one safety switch connected to the Down-Tower Fiber Optic Safety System (FOSS). The output of the Up-Tower FOSS is a relay providing a 24-volt supply to the blade pitch controller 206. The switching elements include two emergency safety switches (ESS#1 and #2), a rotor lock (RL) switch, an overspeed (OS) sensor, and a watchdog (WD) timer. Hence, if all safety switches ESS#1, ESS#2, RL, OS, WD are in their closed positions, indicating a safe condition, the transmitter (UTx, DTx) in each transceiver 202, 204 transmits an optical signal to the receiver (URx, DRx). The transmission of the optical signal is routed either from the up-tower transmitter (UTx) to the down-tower receiver (DRx) or from the down-tower transmitter (DTx) to the up-tower receiver (URx). The receiver (URx, DRx) in each transceiver 202, 204, in turn, generates an electrical signal to control the FOSS relay and provides a 24-volt signal to the pitch controller 206. This allows the pitch controller to operate as a servo system. Furthermore, this allows pitching of the blades to the nominal operating position.

The blade pitch controller 206 includes emergency feather command relays (EFC1, EFC2, EFC3) for the three axes. In order for the blade pitch system to pitch the blades to a desired position, power must be applied to all three EFC relays (EFC1, EFC2, EFC3). Therefore, the blade pitch controller 206 may pitch the turbine blades into a desired position during the safe condition. Otherwise, if no power is detected, or if any of the safety switches ESS#1, ESS#2, RL, OS, WD are open, indicating an unsafe or fail condition, the blade pitch controller 206 feathers the blades to a 90-degree position for safety.

Each transceiver 202, 204 also includes a corresponding power supply (UPS or DPS) and a filter. In the illustrated embodiment, the up-tower power supply (UPS) supplies +24 V to the up-tower transceiver 202, while the down-tower power supply (DPS) supplies +24 V to the down-tower transceiver 204. However, although the illustrated embodiment uses +24 V for illustrative purposes, other applications may use voltages other than +24 V. Hence, any loss of power in the power supply, or interruption of the optical signal, triggered by a fail condition at the switches or caused by a failed optical conductor 210, may result in interruption of power to the blade pitch controller 206 to operate the feather relays (EFC1, EFC2, EFC3). This triggers an issuance of the emergency feather command (EFC) to feather the turbine blades.

Figure 3:
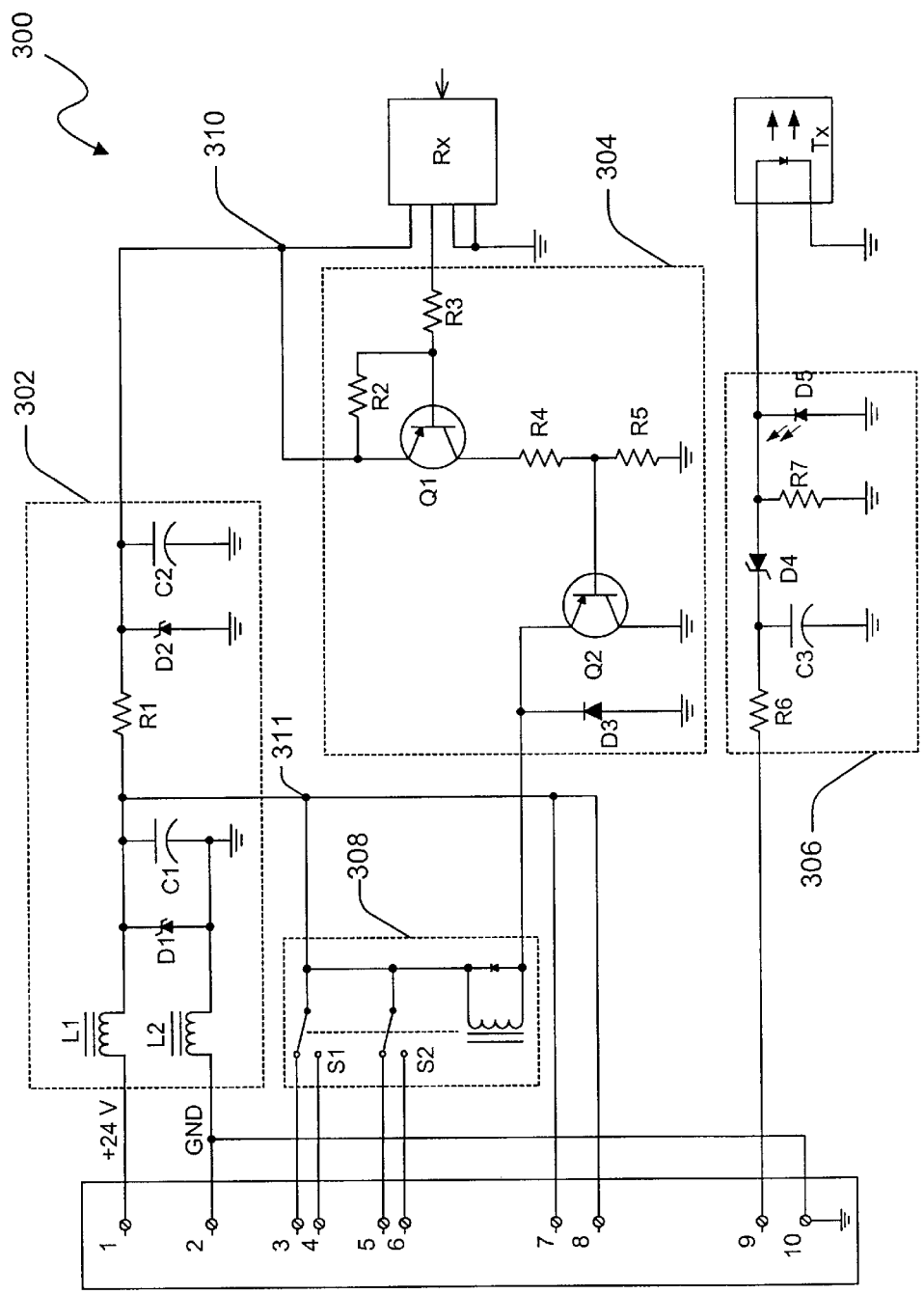
FIG. 3 shows a schematic diagram of a fiber optic safety system transceiver according to an embodiment of the present invention.

A schematic diagram of a fiber optic safety system transceiver 300 according to an embodiment of the present invention is shown in FIG. 3. The transceiver 300 of the present embodiment is substantially similar in design and function to the transceivers 202, 204 of FIG. 2.

In the illustrated embodiment, the transceiver 300 receives the D.C. supply voltage (e.g. +24 V) through pins 1 and 2. Filtering, electromagnetic interference protection, and transient over-voltage protection for this supply are provided by inductors L1, L2, capacitor C1 and zener diode D1. Resistor R1, and Zener diode D2, along with filter capacitor C2, provide a lower regulated voltage for operation of the actual integrated fiber optic receiver (Rx) and its relay driver circuit 304, at node 310. The 24 VDC supply voltage (filtered and protected) is used as a supply for the relay and a supply for external safety switching elements, at node 311.

The filtered DC voltage at the output node 311 is then coupled to the series of switches (ESS#1, ESS#2, RL, OS, WD), connected to pins 7 or 8. The voltage is then configured to provide a safe condition signal at pin 9 when the switches (ESS#1, ESS#2, RL, OS, WD) are in closed positions. Furthermore, the safe condition signal at pin 9 is used to drive and trigger an optical signal at the transmitter (Tx) through an LED driver circuit, 306. The LED driver circuit 306 employs a Zener diode to provide a threshold of voltage below which the LED cannot be turned on. Current through Zener D4 is controller by resistor R6. Capacitor C3 provides filtering for high frequency signals, while LED D5 provides both reverse voltage protection and also acts as an indicator of a safe condition on the series of safety switches connected to pin 9. Resistor R7 provides a constant load to the driver circuit during periods when the Tx LED is reversed biased.

The signal is then transmitted across an optical conductor 210 and is used to trigger an electrical signal at the opposite Fiber Optic Safety System (FOSS) Transceiver's fiber optic receiver (Rx). This signal from the receiver (Rx) drives transistors Q1 and Q2 which make up a relay driver for the receiver output signal shown in 304. The relay driver includes an NPN transistor biased by resistors R2 and R3 to provide an output signal at its collector when there is an optical signal present on the Rx output. This output voltage on the collector of transistor Q1 is used to drive transistor Q2 through its bias resistors R4 and R5 to provide the proper current to saturate Q2 and turn on the relay in block 308. Other driver circuits may be required depending on the drive current requirements of the relay 308 and the output characteristics of Rx. Diode D3 is used to protect transistor Q22 from reverse voltage generated by the coil of the relay in 308 when this relay is turned off. The output signal of relay 308 provides a 24-volt signal to the blade pitch controller 206 when there is a safe condition. This enables the blades to be appropriately positioned.

Otherwise, when any of the switches (ESS#1, ESS#2, RL, OS, WD) in the series is in an open position, no signal may reach the transmitter (Tx) through pin 9, which indicates an unsafe/fail condition. This causes the relay in 308 to remain open, and fails to provide appropriate supply voltage to the FEC relays (EFC1, EFC2, EFC3) in the blade pitch controller 206. The controller 206, in turn, feathers the turbine blades into a 90-degree position for safety.

Figure 4:
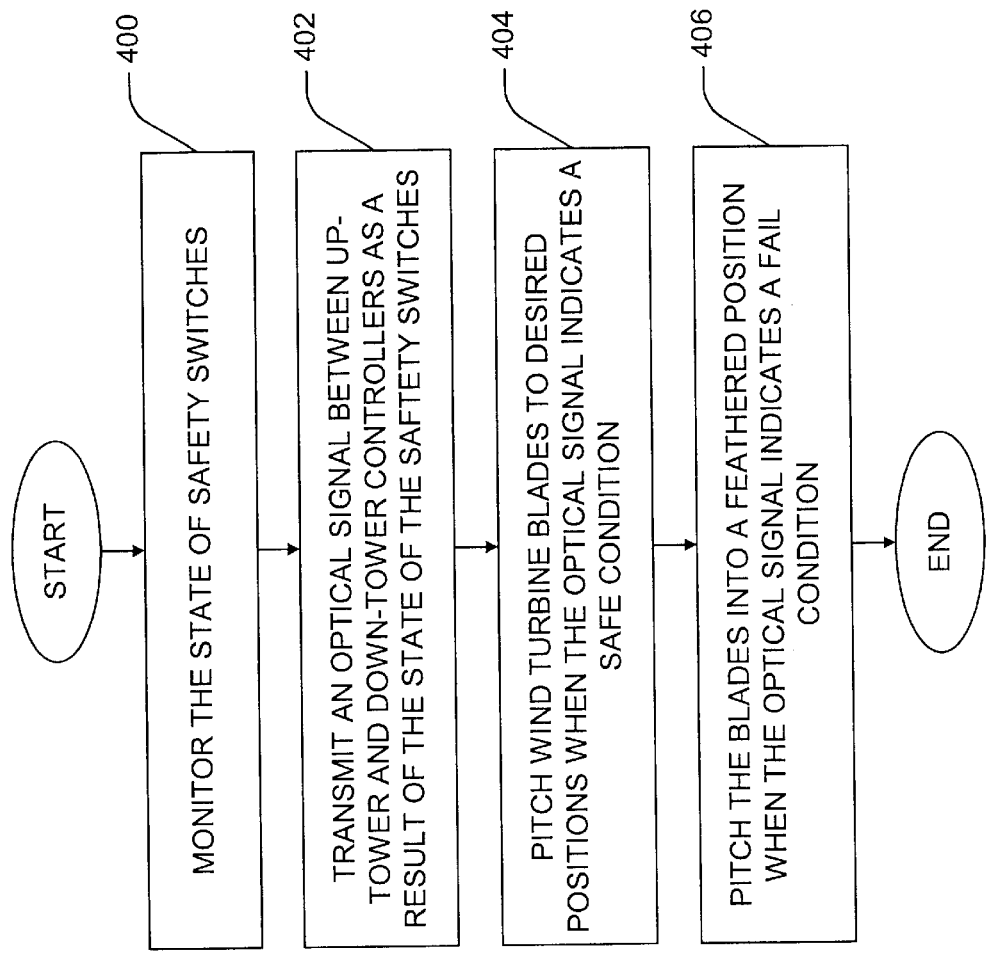
FIG. 4 illustrates a method for optically monitoring safety conditions of a wind turbine in accordance with an embodiment of the present invention.

FIG. 4 illustrates a method for optically monitoring safety conditions of a wind turbine in accordance with an embodiment of the present invention. The method includes monitoring the state of safety switches, at 400. At 402, an optical signal is transmitted between up-tower and down-tower controllers as a result of the state of the safety switches. If no unsafe or fail conditions are detected, the safety switches are turned on. Otherwise, if unsafe or fail conditions are detected, the switches are turned off. Hence, wind turbine blades are pitched to desired positions, at 404, when the optical signal indicates a safe condition. Otherwise, the blades are pitched into a feathered position, at 406, when optical signal indicates a fail condition.

Alternatively, the output of the safety system may simply apply a mechanical brake, bringing the turbine to a stop. This is normally the case when variable pitch blades are not used on a particular turbine design.

Advantages of the present embodiments include the fact that since the optical signal must be present to engage the relays (EFC1, EFC2, EFC3), the fiber optic safety system 200 is fail-safe. This means that if any of the safety switches, optical conductors, other connections, and DC power supplies fail, the turbine blades are pitched into a safe condition (i.e., feathered position). Furthermore, since the transceivers 202, 204 do not use any processors or controllers requiring maintenance of complex clocks but use only simple components, the fiber optic safety system 200 may be configured as a reliable system that is critical during an emergency condition.

There has been disclosed herein embodiments for a wind turbine fiber optic safety system, which includes transceivers configured to convert between electrical and optical signals. Hence, the safety signals are transmitted between up-tower and down-tower controllers by optical conductors. This provides protection for supply voltages from electromagnetic interferences, transient over-voltage events caused by switching systems located within the turbine control system and from outside events such as lightning.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the embodiments may be practiced without some of these specific details. For example, the fiber optic safety system of the present embodiments may be used for purposes other than for monitoring the safety condition of the wind turbine. For another example, although the switching elements (ESS#1, ESS#2, RL, OS, WD) are implemented with switches, other components such as transistors may be used to implement the switching elements (ESS, RL, OS, WD). In other instances, well-known structures and functions were not described in elaborate detail in order to avoid obscuring the subject matter of the present invention. Accordingly, the scope and spirit of the invention should be judged in terms of the claims which follow.

What is claimed is:

1. A fiber optic safety system for a wind turbine, comprising:
    a series of switching elements coupled together within one of a down tower and an up tower of the wind turbine to indicate a fail-safe condition of the wind turbine;
    a plurality of optical transceivers coupled to the series of switching elements to optically connect the down tower and the up tower;
    a plurality of optical conductors coupled to the plurality of optical transceivers to carry optical signals between the down tower and the up tower, the optical signals indicating the fail-safe condition of one of the down tower and the up tower; and
    a blade pitch controller connected to an up-tower optical transceiver, wherein said controller controls pitch of wind turbine blades in response to the optical signals.

2. The system of claim 1, wherein said plurality of optical conductors includes fiber optic cables.

3. The system of claim 1, wherein said plurality of switching elements includes switches.

4. The system of claim 1, wherein said plurality of switching elements includes an emergency safety switch.

5. The system of claim 1, wherein said plurality of switching elements includes a rotor lock switch.

6. The system of claim 1, wherein said plurality of switching elements includes an overspeed sensor.

7. The system of claim 1, wherein said plurality of switching elements includes a watchdog timer.

8. The system of claim 1, further comprising:
    a plurality of power supplies to power said plurality of optical transceivers.

9. The system of claim 1, wherein each of said plurality of optical transceivers includes:
    a receiver to receive the optical signal from said plurality of optical conductors; and
    a transmitter to couple the optical signal onto said plurality of optical conductors.

10. The system of claim 9, further comprising:
    a first driver to enable the transmitter to couple the optical signal onto said plurality of optical conductors in response to the fail-safe condition from said plurality of switching elements.

11. The system of claim 9, further comprising:
    a second driver to generate an electrical signal in response to the optical signal from the receiver.

12. The system of claim 11, further comprising:
    a relay to receive said electrical signal, and to drive the blade pitch controller.

13. A method, comprising:
    monitoring a state of safety switches, the safety switches being coupled in series within one of a down tower and an up tower to indicate a fail-safe condition, wherein the down tower and the up tower are optically coupled to each other;
    transmitting optical signals between the up tower and the down tower as a result of the state of safety switches;
    first pitching wind turbine blades to desired positions when the optical signals indicate a safe condition; and
    second pitching the wind turbine blades into a feathered position when the optical signals indicate a fail condition.

14. The method of claim 13, wherein the state of safety switches includes a switch-open state and a switch-closed state.

15. The method of claim 14, wherein the switch-closed state indicates the safe condition.

16. The method of claim 14, wherein the switch-open state indicates the fail condition.

17. The method of claim 13, wherein said transmitting an optical signal includes coupling the optical signals onto optical conductors.

18. The method of claim 13, wherein said second pitching includes driving emergency feather command relays such that the relays pitch the wind turbine blades into a 90-degree position.

19. A fiber optic safety system for a wind turbine, comprising:
    an up-tower controller having a first plurality of switches to indicate a first fail-safe condition;
    a down-tower controller optically coupled to the up-tower controller, the down-tower controller having a second plurality of switches to indicate a second fail-safe condition; and
    a blade pitch controller coupled to the up-tower controller to control pitch of wind turbine blades of the wind turbine, in response to at least one of the first and second fail-safe conditions,
    wherein the down-tower controller transmits first optical signals to the up-tower controller in response to the second fail-safe condition and the up-tower controller controls the blade pitch controller in response to the first optical signals.

20. The fiber optic safety system of claim 19, wherein the up-tower controller further transmits second optical signals to the down-tower controller in response to the first fail-safe condition.

* * * * *